United States Patent [19]
Osamu et al.

[11] 3,805,134
[45] Apr. 16, 1974

[54] BRUSHLESS DC MOTOR USING HALL ELEMENTS

[75] Inventors: Samuta Osamu; Ohno Hirotoshi; Nakazawa Tadao, all of Yokohama, Japan

[73] Assignee: Victor Company of Japan, Ltd., Yokohama, Japan

[22] Filed: Sept. 18, 1972

[21] Appl. No.: 289,944

[30] Foreign Application Priority Data
Sept. 18, 1971 Japan.............................. 46-72632
Jan. 18, 1972 Japan.............................. 47-6626

[52] U.S. Cl.................. 318/254, 318/138, 318/439
[51] Int. Cl. ...................................... H02k 29/02
[58] Field of Search ........... 318/254, 138, 439, 696

[56] References Cited
UNITED STATES PATENTS

| | | | |
|---|---|---|---|
| 3,652,909 | 3/1972 | Rainer | 318/254 |
| 3,185,910 | 5/1965 | Knapp | 318/254 |
| 3,719,865 | 3/1973 | Ott | 318/254 |
| 3,159,777 | 12/1964 | Manteuffel | 318/254 X |
| 3,517,289 | 6/1970 | Brunner et al. | 318/254 |
| 3,590,353 | 6/1971 | Kobayashi | 318/254 |
| 3,716,769 | 2/1973 | Brunner | 318/254 |
| 3,720,865 | 3/1913 | Bregeault | 318/254 |

*Primary Examiner*—G. R. Simmons
*Attorney, Agent, or Firm*—Holman & Stern

[57] ABSTRACT

A brushless DC motor is disclosed in which Hall elements are mounted on projections of a holder projecting with respect to the peripheral surface of the rotor made up of a permanent magnet so that magnetic flux from the permanent magnet passes in a concentrated state therethrough, whereby the magnetic flux is caused to concentrate with high density on the Hall elements thereby to increase the output thereof.

3 Claims, 23 Drawing Figures

PATENTED APR 16 1974 3,805,134

PATENTED APR 16 1974 3,805,134

BRUSHLESS DC MOTOR USING HALL ELEMENTS

BACKGROUND OF THE INVENTION

This invention relates generally to a brushless DC motor and, more particularly, to a brushless DC motor in which Hall elements are provided on projecting parts of a holder provided with these projecting parts with respect to the peripheral cylindrical surface of the rotor made up of a permanent magnet so that the magnetic flux from the permanent magnet will concentrate and pass through the projecting parts.

Brushless motors known heretofore have all been ones of bipolar type, and those having four coils with two poles (and also those having two coils respectively with intermediate taps) have had large variations in the torque produced within one revolution of 360°. Particularly during rotation at slow speeds below 1,000 rpm., there have been disadvantages such as intense vibration and variations in rotational speed.

As one measure for overcoming these disadvantages, the method of using a large number of coils L in order to reduce the angle of rotation covered by one coil is known. By this method, however, the price of the motor inevitably becomes high not only because of the coils but also because of the necessity of using also a large number of expensive Hall elements.

Another method resorted to in attempting to eliminate the above described disadvantages comprises of providing vertical grooves in the surface of the iron core of the stator in the part thereof facing the rotor and installing Hall elements within these grooves. However, magnetic flux has the property of concentrating in places of minimum distance, and a high magnetic flux density cannot always be obtained at the parts where the Hall elements are provided in the grooves. For this reason, a large permanent magnet is necessary, or Hall elements of high sensitivity, that is, of high price, become necessary in order to drive power transistors with the output voltage of the Hall elements.

SUMMARY OF THE INVENTION

Accordingly, an object of the present invention is to provide a new and useful brushless DC motor in which the difficulties accompanying known brushless DC motors as described above are overcome.

Another object of the invention is to provide a brushless DC motor in which the density of the magnetic flux passing through the Hall elements is made high, and Hall elements capable of obtaining high Hall voltage are used.

Another object of the invention is to construct a multipolar brushless DC motor through the use of only a few Hall elements, thereby to provide an inexpensive motor of excellent performance in low-speed rotation and having no variations in rotational torque.

Still another object of the invention is to provide a brushless DC motor wherein the grooves in the stator core are formed obliquely, thereby to reduce variations in the rotational torque and to reduce vibration.

A further object of the invention is to provide a brushless DC motor wherein Hall elements are used, and wherein the gap between each Hall element and the pole face of the rotor is made constant, and differences between the outputs of the Hall elements are made small.

A further object of the invention is to provide a brushless DC motor which can be assembled in a simple yet positive and accurate manner.

A still further object of the invention is to provide a brushless DC motor wherein the work of connecting the lead wires of the Hall elements and the ends of the stator coil can be carried out in a simple yet positive manner, and circuit breakage due to disconnection or wire breakage cannot easily occur.

Further objects and other features of the invention will become apparent from the following detailed description with respect to preferred embodiments of the invention when read in conjunction with the accompanying drawings.

DETAILED DESCRIPTION OF THE INVENTION

Figure 1:
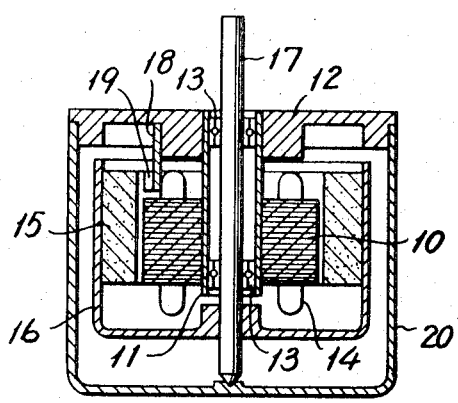
FIG. 1 is a side view, in longitudinal section, of a first embodiment of the brushless DC motor according to this invention.
Figure 2:
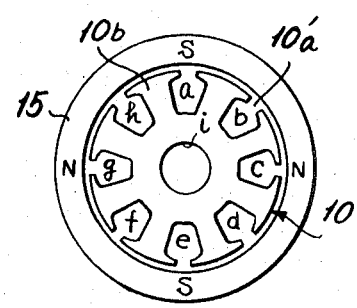
FIG. 2 is a cross sectional view indicating the relationship between the rotor and the core of the motor shown in FIG. 1.
Figure 6A:
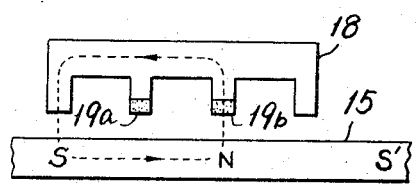
FIGS. 6A through 6D are developments respectively explaining the actions of the rotor and Hall elements.
Figure 6C:
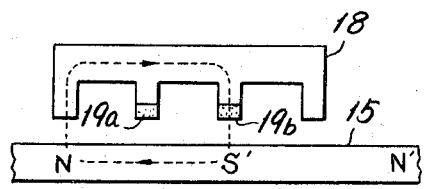
Figure 6B:
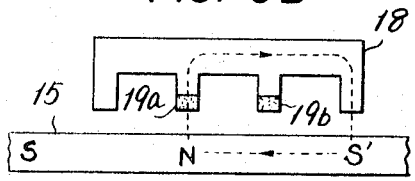
Figure 6D:
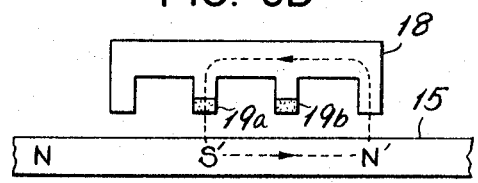
Figure 7:
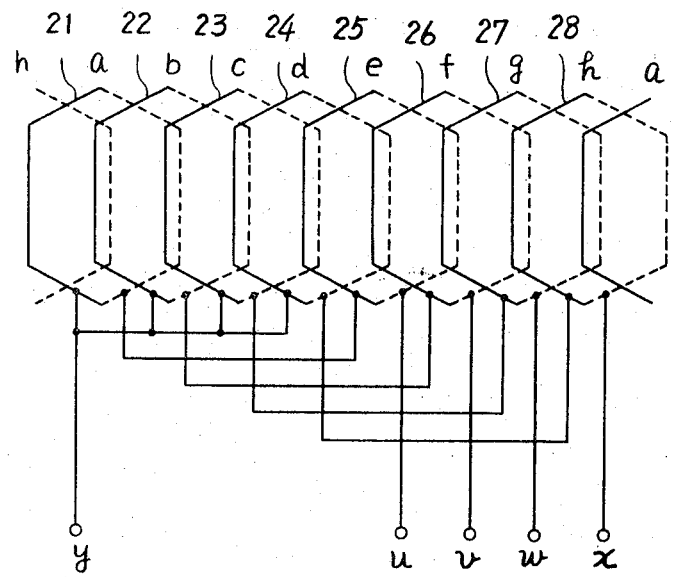
FIG. 7 is an electrical connection diagram indicating the connections of coils.

In the first embodiment of the motor according to the present invention as illustrated in FIGS. 1 through 9, the stator core 10 comprises a plurality of iron sheets in laminated state, each sheet having eight slots *a* through $h$ and a central hole $i$ as shown in FIG. 2. A tube 11 is fixedly fitted in the central hole $i$ of the iron core 10 and, at the same time, is fixedly fitted in a central hole of a motor holder or motor case end plate 12, whereby the core 10 is held fixed relative to the motor frame structure. The tube 11 is provided therewithin with bearings 13. Coils 14 are wound around parts of the stator 10 and comprise, for example, eight coil units 21 through 28 as indicated in FIG. 7.

As shown in FIG. 2, the motor has a rotor 15 of cylindrical shape concentrically surrounding the stator 10 and consists essentially of a permanent magnet having two N and two S poles disposed alternately around the inner surface thereof. The rotor 15 fixedly supported by a rotor case 16 of cylindrical shape with a closed end having a central hole in which a rotor shaft 17 is fixedly fitted. The shaft 17 is rotatably fitted in the bearings 13. The shaft 17 thereby rotatably supports the rotor 15 and, at the same time, functions to transmit torque from the rotor to the outside. A holder 18 is provided to support two Hall elements 19a and 19b as shown in FIG. 3 in positions to confront the inner surface of the rotor 15. These Hall elements 19a and 19b have one pair of current terminals and one pair of voltage terminals and are of known type which, when a magnetic field is applied perpendicularly to the current flow direction, generate electromotive forces in directions respectively perpendicular to the current flow direction and the magnetic field direction. The entire motor is housed within a motor case 20 of the shape of a cylindrical cup, the open end of which is covered by the aforementioned motor case end plate 12.

Figure 3A:
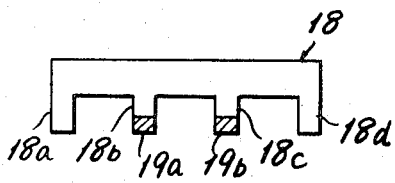
FIGS. 3A and 3B are developments respectively showing embodiments of Hall element holders in the motor according to the invention.
Figure 3B:
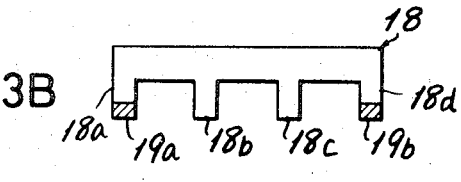
Figure 4:
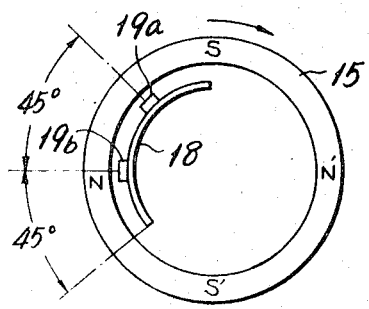
FIG. 4 is a cross sectional view indicating the positional relationship between a Hall element holder and the rotor.

Two embodiments of the holder 18 are shown by the developments of FIGS. 3A and 3B. As indicated, each holder 18 is a comb-like plate made of a magnetic material having four projections 18a, 18b, 81c, and 18d projecting downward so as to confront the inner peripheral surface of the rotor 15. The cross section of the holder 18 is arcuate as indicated in FIG. 4. The outer shapes of the projections 18a through 18d of the holder 18 are the same, and the width thereof is substantially equal to the width of the Hall elements 19a and 19b. In the embodiment illustrated in FIG. 3A, the Hall elements 19a and 19b are disposed on projections 18b and 18c spaced apart by 45° as shown in FIG. 4. In the embodiment illustrated in FIG. 4B, the Hall elements 19a and 19b are disposed on projections 18a and 18d at the two ends spaced apart by an angle of 135°.

Figure 5:
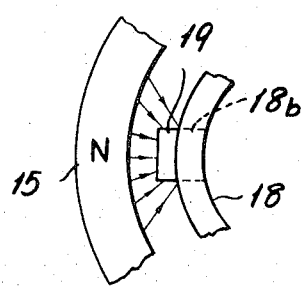
FIG. 5 is a fragmentary, relatively enlarged, cross sectional view of a holder and a Hall element.

Thus, the projections of the holder 18 function to hold the Hall elements 19a and 19b in positions to confront the rotor 15 and, moreover, to position these Hall elements accurately at positions spaced apart by angles of 45° and 135°. These projects have the additional function of passing the magnetic flux density in a concentrated manner and increasing the magnetic flux density imparted to the Hall elements 19a and 19b. More specifically, as indicated in FIG. 5, since the Hall element 19a (or 19b) is provided on the projection 18b (18c, 18a, or 18d) of the holder 18, the magnetic flux is not diffused as in the case of the conventional arrangement wherein the Hall elements are disposed in grooves provided in the iron core, and the magnetic flux concentrates with high density with respect to the Hall elements 19a and 19b, which project from the surface of the projections of the holder 18 and are in the close proximity of the permanent magnet constituting the rotor 15. Accordingly, with Hall elements of the same order of sensitivity, an output of higher Hall voltage can be obtained from the motor of this invention than heretofore.

Figure 9A:
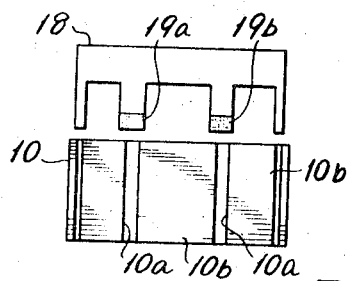
FIGS. 9A and 9B are side views respectively indicating configurations of grooves in stator cores.
Figure 9B:
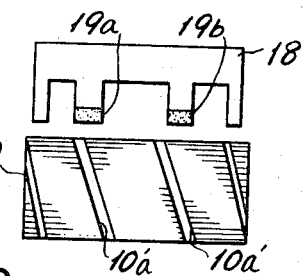

Two embodiments of side views of the laminated stator core 10 are shown in FIGS. 9A and 9B. In the case of the core of FIG. 9A wherein the grooves 10a are formed to extend in the axial direction, and there are four poles, the positional relation between the core grooves 10a and the Hall element 19a and 19b is such that the magnetic poles of the permanent magnet and the raised part 10b between the grooves 10a of the iron core coincide simultaneously at four positions. Consequently, a large attractive force is produced, and this becomes a cause of variations or fluctuations in torque or of vibration.

Accordingly, in the embodiment of the present invention, the grooves 10a in the stator core 10 are formed obliquely as shown in FIG. 9B in order to solve this problem. If the grooves of a conventional core were to be formed obliquely, and Hall elements were to be installed therein, the width of the grooves would vary because of the angle of inclination of the oblique grooves, whereby it would be difficult to carry out accurate positioning. In contrast, this diffuculty can be overcome by the present invention since Hall elements are not installed in the stator core.

Figure 8:
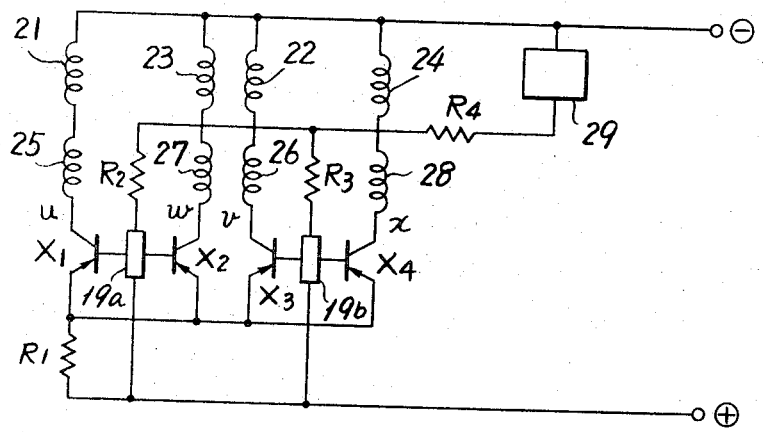
FIG. 8 is a circuit diagram indicating the connections of windings and Hall elements.

FIG. 7 shows eight windings 21 through 28, which are so arranged that windings 21 and 25, 22 and 26, 23 and 27, and 24 and 28 are respectively connected in series. These windings are connected in a circuit as shown in FIG. 8. As indicated in FIG. 8, the terminals $u$, $w$, $v$, and $x$ of the windings 25 through 28 are respectively connected to the collectors of four PNP transistors $X_1$, $X_2$, $X_3$, and $X_4$. Two Hall elements 19a and 19b are respectively connected to the bases of the transistors $X_1$ and $X_2$ and of $X_3$ and $X_4$. The emitters of these transistors $X_1$ through $X_4$ are respectively connected through a resistor $R_1$ to the $\oplus$ terminal of a power source, and the common terminal $y$ of the windings 21 through 24 is connected to the $\ominus$ terminal of the power source. One current terminal of each of the Hall elements 19a and 19b is connected to the $\oplus$ terminal of the power source, while the other current terminals are connected by way of resistors $R_2$, $R_3$, $R_4$, and a current control circuit 29 to the $\ominus$ terminal of the power source, a suitable current being supplied to the Hall elements 19a and 19b.

The brushless DC motor of the above described construction and electrical organization according to the present invention operates in the following manner.

In the case where the Hall elements 19a and 19b and the magnetic poles of the rotor 15 have the positional relationship indicated in FIGS. 4 and 6A, the N poles impart a magnetic field exactly perpendicular to the Hall element 19b. For this reason, magnetic flux is generated with a loop as indicated in FIG. 6A, and a Hall voltage due to the Hall effect is produced in only the Hall element 19b. Since negative and positive potentials are then produced respectively at the bases of the transistors $X_3$ and $X_4$, only the transistor $X_3$ assumes the conductive state. Consequently, a current flows through the coils 22 and 26, and currents flow through the conductors within the stator grooves $a$, $c$, $e$, and $g$ as shown in FIG. 2 which respectively confront the magnetic poles N, S, N', and S', whereupon a torque is produced with respect to the rotor 15.

Next, when the rotor 15 rotates through 45 degrees of angle to assume the state indicated in FIG. 6B, the N pole comes above the Hall element 19a. Consequently, a magnetic field is imparted perpendicularly to the Hall element 19a, and a voltage is generated by the Hall effect at the Hall element 19a similarly as described above. Since none of the poles is confronting the Hall element 19b at this time, no voltage is generated at this element, and the transistor $X_3$ is nonconductive. Since a voltage is generated at the Hall element 19a, negative and positive potentials are impressed respectively on the bases of the transistors $X_1$ and $X_2$, and the transistor $X_1$ becomes conductive. Accordingly, a current flows through the coils 21 and 25, and a current flows through the stator coils confronting the stator grooves b, d, f, and h. As a result, a torque is produced, and the rotor 15 continues to rotate.

When the pole S' comes above the Hall elements 19a and 19b successively as indicated in FIGS. 6C and 6D, in turn, the transistors $X_4$ and $X_2$ successively become conductive, and currents flow successively through coils 24 and 26 and coils 23 and 27, whereby the rotor 15 continues to rotate. Since the operation returns to the initial conditions every time the rotor 15 rotates through 45° as described above, the rotation of the rotor during one revolution is extremely smooth.

Figure 10:
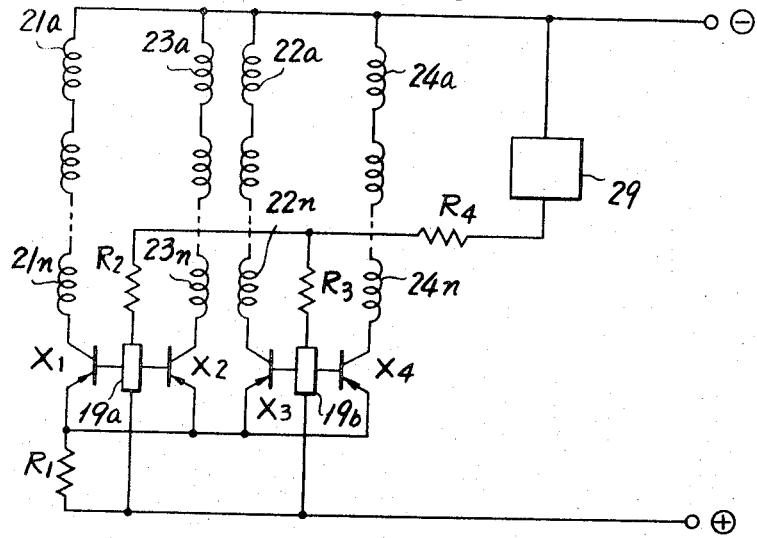
FIG. 10 is a circuit diagram indicating the connections of windings and Hall elements of a multipolar motor constituting a modification of the motor of the invention.

While the foregoing first embodiment has been described with respect to a four-pole motor, a greater number of poles becomes necessary for producing a motor of good performance at low speeds or of small torque variation. In this case, the magnetic pole arrangement of the permanent magnetic constituting the rotor 15 is 2n-pole, where n is a positive integer such as 1, 2, 3, ... . That is, the number of N poles is n, and the number of S poles is n. Furthermore, the number of grooves in the stator core is 4n, and 4n coils are wound in accordance with FIG. 7. As indicated in FIG. 10, four circuits conprising n series-connected coils 21a through 21n, 22a through 22n, 23a through 23n, and 24a through 24n are formed. Furthermore, the angular spacing θ between the positions of the projections of the holder 18 as shown in FIG. 4 is made equal to 360°/4n. In this manner, a low-speed motor of more than four poles can be readily made. In this case, ample rectification effect can be attained with two Hall elements and four transistors irrespective of the number of poles.

Various modifications and additions can be made in the invention as described above with respect to only a few preferred embodiments thereof. For example, amplifiers may be inserted between the Hall elements 19a and 19b and the bases of the transistors $X_1$ through $X_4$. Furthermore, instead of connecting the large number of coils in series, they may be connected in parallel.

Figure 11:
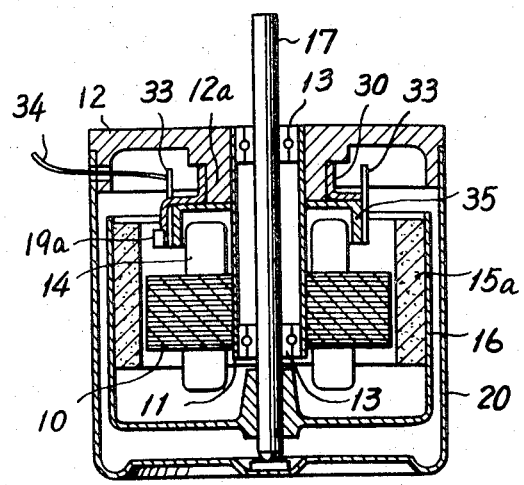
FIG. 11 is a side view, in longitudinal section of a second embodiment of the brushless DC motor employing Hall elements according to the invention.

The second embodiment of this invention as shown in FIG. 11 and in the figures that follow is a six-pole motor which corresponds to a case where n is 3 for the above-mentioned multipolar motor.

Referring to FIG. 11 which is a side view in longitudinal section, the laminated stator core 10 with the stator coils 14 is fitted on the tube 11 which is, in turn, fitted securely in a central hole of the motor holder or motor case end plate 12. Although not illustrated, the rotor 15a is magnetized with three pairs of N and S poles. This necessitates the provision of three times four, or 12 slots formed in the peripheral surface of the stator core 10 which is confronting the rotor 15a. Within the tube 11, the shaft 17 is rotatably supported by the bearings 13.

Figure 12:
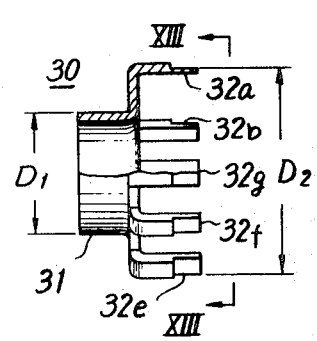
FIG. 12 is a side view, with a part cut away and a part in section, showing an element holder.
Figure 13:
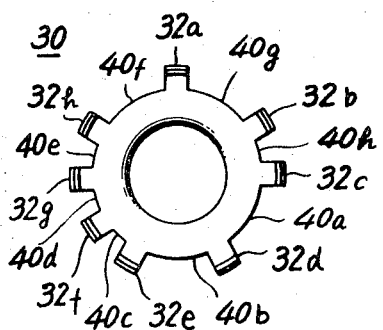
FIG. 13 is a rear view along the line XIII — XIII as viewed in the arrow direction in FIG. 12.
Figure 16:
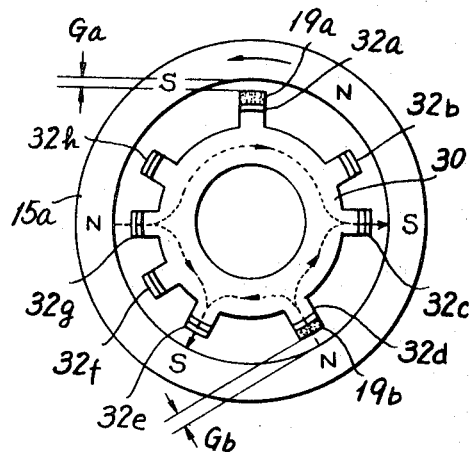
FIGS. 16 and 17 are cross sectional views respectively indicating positional relationships between the rotor and the element holder.
Figure 17:
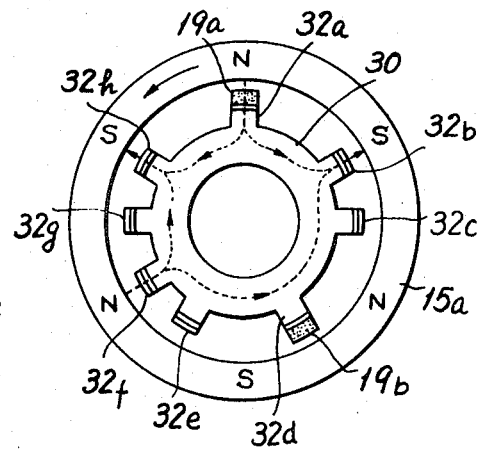

The rotor 15a surrounds the stator core 10, and, as illustrated in FIGS. 16 and 17, a permanent magnet composed of three pairs of alternately disposed N- and S-poles is formed on the inner circumferential surface of the rotor. The rotor casing 16 for securely supporting the rotor 15a is rigidly fitted on the rotating shaft 17. A Hall element holder 30 has a configuration as illustrated in FIGS. 12 and 13 and is rigidly supported with its cylindrical section 31 fitted on the part 12a of the motor holder 12. The Hall element holder 30 is made of a magnetic material such as iron having a comparatively high permeability. Eight tooth-like projections 32a through 32h projecting longitudinally from the cylindrical section 31 of diameter $D_1$ are disposed around a circle of diameter $D_2$ as illustrated in FIG. 12. The eight projections 32a through 32h projecting from the element holder 31 are spaced apart in succession as shown in FIG. 13 by an angle of 30° or 60°. A notch is provided on each of the eight projections. As shown FIGS. 16 and 17, the two Hall elements 19a and 19b are mounted fixedly in the notches of the two projections 32a and 32d each spaced apart by 60° from adjacent projections.

The two Hall elements 19a and 19b mounted in the notches of the projections 32a and 32d as well as the other projections 32b, 32c, 32e, 32f, and 32g all confront the inner peripheral surface of the rotor 15a. The circle formed by these projections is concentric with the circumference of the cylindrical section 31. The outer circumference of the part 12a of the motor holder 12 on which the cylindrical section 31 is fitted also forms a true circle concentric with the rotating shaft 17. By merely fitting the cylindrical section 31 with pressure on the collar section 12a of the motor holder 12, the projections 32a through 32h become disposed on a true circle concentric with the rotating shaft 17 to maintain a prescribed spacing from the inner peripheral surface of the rotor 15a. Accordingly, the Hall elements 19a and 19b produce equal gaps Ga and Gb with the inner peripheral surface of the rotor 15a as indicated in FIGS. 16 and 17.

Lead wires 39a through 39h of the Hall elements 19a and 19b are connected to lead wires 34 led to the outside of the motor via a printed circuit section on a flexible cylindrical wiring board 33 made of a flexible material, such as polypropylene, polyester, etc., of the order of 2 mm in thickness, which is disposed in the vicinity of the projections 32a and 32b of the element holder 30. The ends of the stator coils 14a through 14d are also connected to the lead wire 34 via a printed wiring section on the cylindrical wiring board 33.

Figure 18:
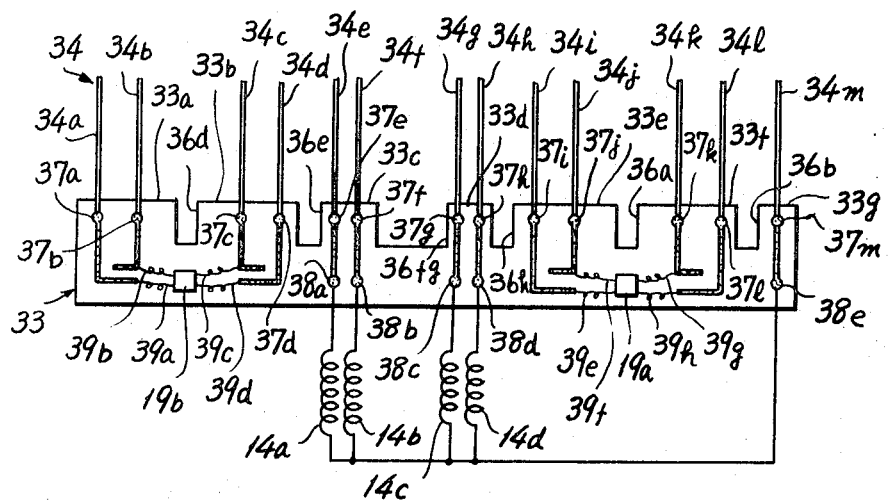
FIG. 18 is a development, combined with a connection diagram, showing a wiring base structure of cylindrical form.

Referring to FIG. 18 which is a development of the wiring board 33 as an embodiment of the wiring board printed wiring made of copper foil is provided on the wiring board 33 by a known etching technique, for example. On the upper part of the base plate 33, there are provided slots 36a through 36h of widths determined so as to correspond to the widths of the projections 32a through 32h of the element holder 30.

The wiring board 33 of cylindrical form of a diameter less than that of a circle formed by the projections 32a through 32h is installed on the element holder 30 from below so that the bases of the projections 32a through 32h of the element holder 30 are inserted respectively into cutout slots 36a through 36h. Therefore, the projections 32f and 32g are fitted into the cutout slot 36fg, while the projected parts 33a through 33g formed between the notches 36a and 36h of the wiring board are fitted into the recessed parts 40a through 40h, their widths respectively corresponding to each other. The wiring board 33, being of flexible material, continually tends to open and extend and hence, after installation on the element holder 30, it must be securely held in position with respect to the interval of projections 32a through 32h.

At the printed wiring ends on the projected parts 33a through 33g of the wiring board 33, there are provided copper foil terminals 37a through 37m which are respectively connected to the lead wires 34a through 34m.

The Hall element 19b mounted on the element holder 30 so as to correspond to the illustrated position on the wiring board 33 has its leads 39a through 39d respectively connected to terminals 36a through 36d by means of conductors such as solder on the wiring board. In like manner, the Hall element 19a has its leads 39e through 39h respectively connected to terminals 37i through 37l, by means of conductors on the wiring board. With respect to the wiring board 33, the ends on one side of coils 14a through 14d of the stator coils 14 are respectively connected to copper foil terminals 38a through 38d wired and connected to terminals 37e through 37h on the wiring board, while the ends on the other side are connected to terminal 38e wired and connected to terminal 37m. By combining the flexible cylindrical wiring board 33 with the Hall element holder 30, the Hall elements 19a and 19b, the coils 14a through 14d, and the leads 34a through 34m are interconnected easily and securely.

Figure 14:
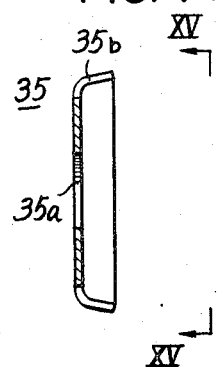
FIG. 14 is a side view, in longitudinal section, of a retaining member.
Figure 15:
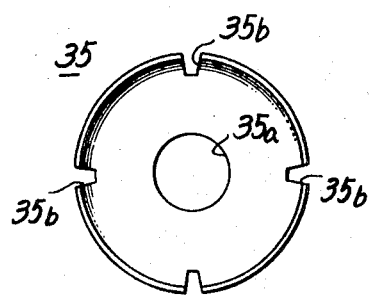
FIG. 15 is a rear view along the line XV — XV as viewed in the arrow direction in FIG. 14.

A retainer 35 has a configuration as shown in FIGS. 14 and 15 and is a comparatively resilient, synthetic resin moulded structure made of polypropylene, of 0.5 mm in thickness in this embodiment. With the tube 11 fitted in the central hole 35a, the retainer 35 is interposed between the element holder 30 and the stator coils 14. The flared peripheral edge of the retainer 35 is provided with slots 35b so as to cover closely the upper part of the stator coils 14, thereby to provide full insulation from the element holder 30 and, at the same time, to hold the wiring board 33 between the peripheral edge of the retainer 35 and the projections 32a through 32h of the element holder 30.

Magnetic circuits are formed between the element holder 30 and the rotor 15a by the confrontation of the Hall elements 19a and 19b and the projections 32b, 32c, and 32e through 32h which have no Hall elements with respect to the magnetic poles of the rotor 15a.

The element holder 30 in this embodiment corresponds to a case in which the numbers of stator poles. rotor poles. and Hall elements are respectively 12, 6, and 2. Although a simple structure having twelve projections spaced at equal intervals 360°/12 is conceivable, the present element holder has a configuration adapted for easy lead wire connections for the Hall elements 19a and 19b by removing projections that should have been existing on both sides of projections 32a and 32d on which the Hall elements 19a and 19b are installed as shown in FIGS. 12 and 13.

Next, a magnetic circuit formed between the rotor and the stator will be described in conjunction with FIGS. 16 and 17.

It will be supposed that the rotor 15a is in the rotational position as shown in FIG. 16 with respect to the fixed and stationary element holder 30. Then, the Hall element 19b faces the N pole of the rotor. At this instant, the projections 32c and 32e respectively face the S poles, and the projection 32g faces the N pole. Therefore, a magnetic path as indicated by the arrow is formed in the element holder 30. Since the N pole applies a magnetic field to the Hall element 19b perpendicularly thereto, a voltage is developed only in the Hall element 19b. By this voltage, a current flows in a specific coil, and the rotor 15a is caused to rotate in the direction indicated by the arrow.

It will be supposed that the rotor 15a has rotated through 30° to take a position as shown in FIG. 17. Then the Hall element 19a faces, at this instant, the N pole of the rotor 15a. The projections 32b and 32h respectively face the S poles, while the projection 32f faces the N pole. Therefore, a magnetic path indicated by the arrow is formed in the element holder 30. Thus, the N pole applies a magnetic field to the Hall element 19a perpendicularly thereto, and a voltage is developed only in the Hall element 19a. The Hall elements 19a and 19b respectively confront the inner peripheral surface of the rotor 15a through clearances Ga and Gb. By suitably reducing these clearances Ga and Gb, magnetic flux can be concentrated in these Hall elements. The variation of these clearances Ga and Gb can be reduced by suitably controlling the circularity of a circle of the diameter $D_2$ formed by the projections 32a through 32h of the element holder 30 and a circle of the diameter $D_1$ of the cylindrical section 31 mounted on the motor holder 12 as well as the concentricity of circles of tthe diameters $D_1$ and $D_2$ with respect to the rotating shaft 17 thereby to reduce extremely the output errors of both elements 19a and 19b. Then the design of the electrical circuit becomes very simple.

In cases where the number of poles of the motor is $2n$ and the number of the Hall elements used is $l$, the angular distance between two adjacent elements should preferably be determined equal to $(360°/2n) \times (1/l) \times p$ (where $p$ is an odd number such as 1, 3, 5, . . . ) in order that the Hall elements face alternately the N and S poles in succession. The number of projections the element holder 30 can be made equal to $2n \times l$. However, it is also possible to provide no projections at the positions adjacent to each of the projections 32d and 32a on which the Hall elements 19a and 19b are mounted. In this case, the number of projections is equal to $2 \times l, - 2l$.

It is also possible to further reduce the number of projections as required, provided the magnetic path passing through the Hall elements remain unimpaired. In such a case, it is necessary that the projections corresponding to the Hall elements be spaced apart as evenly as practical in order to maintain the balance of magnetic flux passing through each Hall element. In this case, the number of projections becomes equal to $2n \times l - l \times z$, wherein $z$ is a positive integer including zero. It will be obvious, however, that the number of projections should in no case be less than $2l$. In general, therefore, the number of projections can be made equal to $2n \times l - 2l - l \times z$.

The first embodiment of this invention is concerned with a four-pole motor incorporating two Hall elements and $n = 2, l = 2$, while $p = 1$ for the case of FIG. 3 A and $p = 3$ for the case of FIG. 3 B. Therefore, the angular distance between the Hall elements for FIG. 3 A is $(360°/2 \times 2) \times (1/2) \times 1 = 45°$ and that for FIG. 3 B is $(360°/2 \times 2) \times (1/2) \times 3 = 135°$. Since two projections are provided at positions adjacent to each projection on which a Hall element is mounted, the number of projections becomes equal to $2n \times l - l \times z$, and, hence that for $z = 2$ becomes $2 \times 2 \times 2 - 2 \times 2 = 2$ The second embodiment of the invention is concerned with a six-pole motor incorporating two Hall elements, that is, $n = 3$ and $l = 2$. Since $p$ is equal to 5, the angular distance between the Hall elements is $(360°/2 \times 3) \times (1/2) \times 5 = 150°$, and the number of projections is equal to $2n \times l - 2l - l \times z$ and $2 \times 3 \times 2 - 2 \times 2 - 2 \times 0 = 8$ for $z = 0$, because projections are not provided at positions adjacent to any projection on which a Hall element is mounted.

Incidentally, the angular distance $(360°/2n) \times (1/l) \times p$ is the optimum value for making the current waveform applied to the stator coils perfectly balanced. If this angle deviates, the balance of the current waveform will collapse, and an uneven rotational torque will be produced. Eventually, the motor will fail to rotate when a deviation angle of $(360°/2n) \times (1/l)$ is produced.

While each of the foregoing embodiments of this invention is concerned with a case in which PNP transistors are incorporated, the operation of the motor will be exactly the same with NPN transistors except that the power supply will become reverse in polarity.

Further, it will be obvious that the above described embodiments of the invention should in no way be restricted to outer-rotor type motors as described, the foregoing explanation being equally applicable to inner-rotor type motors.

Further, this invention is not limited to these embodiments but various variations and modifications may be made without departing from the scope and spirit of the invention.

What we claim is:

1. A brushless DC motor comprising: a rotor consisting essentially of a permanent magnet having a peripheral surface magnetized with $n$ N-poles and $n$ S-poles, where $n$ is a positive integer; a stator core having $2 l n$ grooves in the peripheral surface thereof confronting the magnetized peripheral surface of said rotor; $2 l n$ stator windings wound so as to correspond to said grooves; a holder for holding Hall elements, said holder having a cylindrical section fixedly held on said stator concentrically with the rotating shaft of said rotor and a plurality of projections confronting the peripheral surface of said rotor and spaced at $360°/2 l n$ intervals to allow passage of concentrated magnetic flux therethrough, the tip ends of said projections being disposed on a circle and maintaining a constant small clearance with said magnetized peripheral surface of said rotor; Hall elements rigidly mounted at intervals of $(360°/2n \times l) p$ on said projections of said Hall element holder, where $p$ is an odd integer; and $2l$ switching elements respectively connected to Hall voltage terminals of said Hall elements, said holder constituting a medium for passage of magnetic flux passing through said Hall element from said rotor so that the density of the magnetic flux passing through each of said Hall elements at the tip ends of said projections become large and that the magnetic flux densities in all of said Hall elements become uniform, said $2 l n$ stator windings constituting two coil circuits consisting of $n$ windings connected in series or in parallel, the ends on one side of said coil circuits being connected respectively to said 2switching elements in such a manner that said $2l$ coil circuits are rendered conductive or nonconductive in accordance with the conduction or nonconduction of said switching elements, and the conduction or nonconduction of said switching elements being controlled by the Hall voltages of said $l$ Hall elements.

2. A brushless DC motor according to claim 1 wherein the projections of said Hall element holder which are adjacent to any projection whose tip end supports a Hall element are spaced apart by a greater distance from said projection than others so that the number of projections of said Hall element holder is made equal to $2 l n - (2l + 2z)$, wherein $z$ denotes a positive integer including zero.

3. A brushless DC motor according to claim 1 which further comprises a cylindrical wiring board of comparatively resilient material disposed along the inner side of a circle on which the tip ends of said projections of said Hall element holder are disposed and suitably wired so as to connnect both the lead wires of said Hall elements and the end wires of said stator windings to the lead wires of said wiring board, and a retainer of insulating material disposed between said Hall element holder and said stator windings so as to retain said wiring baord by pressing against said Hall element holder and, at the same time, to insulate and protect said stator windings.

* * * * *